United States Patent
Kataoka et al.

(10) Patent No.: US 10,347,912 B2
(45) Date of Patent: Jul. 9, 2019

(54) POLYCRYSTALLINE MATERIAL AND PRODUCTION METHOD THEREFOR

(71) Applicant: NATIONAL INSTITUTE OF ADVANCED INDUSTRIAL SCIENCE AND TECHNOLOGY, Tokyo (JP)

(72) Inventors: Kunimitsu Kataoka, Tsukuba (JP); Junji Akimoto, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 199 days.

(21) Appl. No.: 15/502,452

(22) PCT Filed: Aug. 6, 2015

(86) PCT No.: PCT/JP2015/072404
§ 371 (c)(1),
(2) Date: Jun. 20, 2017

(87) PCT Pub. No.: WO2016/024530
PCT Pub. Date: Feb. 18, 2016

(65) Prior Publication Data
US 2017/0365847 A1 Dec. 21, 2017

(30) Foreign Application Priority Data
Aug. 14, 2014 (JP) .................. 2014-165253

(51) Int. Cl.
*C01G 23/00* (2006.01)
*H01M 4/485* (2010.01)
*H01M 10/054* (2010.01)
*H01M 10/0525* (2010.01)

(52) U.S. Cl.
CPC .......... *H01M 4/485* (2013.01); *C01G 23/005* (2013.01); *H01M 10/054* (2013.01);
(Continued)

(58) Field of Classification Search
CPC ........................ H01M 4/485; H01M 10/054
See application file for complete search history.

(56) References Cited

U.S. PATENT DOCUMENTS

| 2014/0287302 A1 | 9/2014 | Fukunaga et al. | |
| 2016/0121319 A1* | 5/2016 | Tokudome | ............... B01J 23/20 204/157.5 |
| 2017/0005337 A1* | 1/2017 | Ikejiri | ...................... H01B 1/08 |

FOREIGN PATENT DOCUMENTS

| CN | 103931028 A | 7/2014 |
| JP | 2012-51740 A | 3/2012 |

(Continued)

OTHER PUBLICATIONS

Akimoto, J. et al., "A Large Tunnel Structure of Triclinic . . . ," Institute for Solid State Physics, University of Tokyo, Roppongi, Minato-Ku, Tokyo 106, Japan, Journal of Solid State Chemistry,11, vol. 83, No. 1, 1989, p. 132-139.

(Continued)

*Primary Examiner* — Matthew J Merkling
(74) *Attorney, Agent, or Firm* — Studebaker & Brackett PC

(57) ABSTRACT

Provided are a sodium ion secondary battery and a lithium ion secondary battery capable of undergoing a reversible large-capacity charge/discharge reaction. The sodium and lithium ion secondary batteries each have a positive electrode, a negative electrode, and an electrolyte. The active substance of the positive or negative electrode of these secondary batteries is a single-phase polycrystal represented by the following chemical formula: $Na_xTi_4O_9$ ($2 \leq x \leq 3$), preferably $Na_2Ti_4O_9$, having a one-dimensional tunnel type (Continued)

structure, and belonging to a monoclinic crystal system. This polycrystal is obtained by filling a container made of molybdenum or the like with a raw material containing a sodium compound and at least one of a titanium compound and metal titanium, and firing at 800° C. or more but 1600° C. or less.

6 Claims, 2 Drawing Sheets

(52) U.S. Cl.
CPC ..... *H01M 10/0525* (2013.01); *C01P 2002/72* (2013.01); *C01P 2002/77* (2013.01); *Y02P 70/54* (2015.11)

(56) References Cited

FOREIGN PATENT DOCUMENTS

| | | |
|---|---|---|
| JP | 2013171798 | 9/2013 |
| JP | 2014-29842 | 2/2014 |
| JP | 103931028 A | 7/2014 |

OTHER PUBLICATIONS

Marsh, Richard E., "On the structure of . . . ," Arthur Amos Noyes Laboratory of Chemical Physics, California Institute of Technology, Pasadena, California 91125, Journal of Solid State Chemistry, vol. 86, No. 1, 1990, p. 135.

Dion, M. et al., "The tetratitanates . . . ," Journal of Inorganic and Nuclear Chemistry, vol. 40, No. 5, 1978, p. 917-918.

English Text Translation of Japanese Patent Application No. 2013171798 A, Published on Sep. 2, 2013; 29 pages.

JP2014-29842 Published Feb. 13, 2014, English Translation (18 pages).

Richard E. Marsh, "On the Structure of Na2Ti4O9", Journal of Solid State Chemistry, 1990, May, p. 135, No. 86, vol. 1, Academic Press, Inc.

\* cited by examiner

POLYCRYSTALLINE MATERIAL AND PRODUCTION METHOD THEREFOR

CROSS REFERENCE TO RELATED APPLICATIONS

This application is the U.S. National Phase Application under 35 U.S.C. 371 of International Application No. PCT/JP2015/072404 "Polycrystalline Material and Production Method Therefor" filed on 6 Aug. 2015, which claims priority to Japanese Patent Application JP 2014-165253, filed on 14 Aug. 2014, which the contents of these applications are incorporated by reference herein in their entireties.

TECHNICAL FIELD

The present invention relates to sodium titanium oxide polycrystal usable as an electrode active material of a sodium ion secondary battery or lithium ion secondary battery, a production process of the polycrystal, and a sodium ion secondary battery and a lithium ion secondary battery using the polycrystal.

BACKGROUND ART

Lithium ion secondary batteries have been used for small information devices such as cellular phones, book-sized personal computers, and the like because they have a high energy density and can be operated at high potential. Lithium ion secondary batteries are each comprised mainly of a positive electrode, a negative electrode, and an electrolyte. Lithium complex oxide-based materials are used for the positive electrode, while lithium complex oxide-based materials, carbon materials, metal lithium, lithium alloys and the like are used for the negative electrode. For the electrolyte, for example, a non-aqueous organic electrolyte in liquid form (electrolyte solution) has been used widely. There is a demand for the development of lithium ion secondary battery materials having a higher capacity in anticipation of an increase in demand for large-sized, high-output, and long-life secondary batteries in future as power supplies for automobiles, capacity-enlarged stationary power supplies and the like.

Since large-sized batteries have become popular, research and development of sodium ion secondary batteries making use of sodium have been carried out instead of that of lithium ion secondary batteries making use of lithium which is expensive due to poor resources. The materials of positive and negative electrodes of sodium ion secondary batteries are required to be able to insertion/extraction of sodium ions, be highly reversible, and moreover, have a large sodium insertion/extraction amount. As the materials of a positive electrode of sodium ion secondary batteries, various oxide materials having a tunnel type structure or layered rock-salt type structure have already been reported from such a standpoint.

Examples of reports on negative electrode materials of sodium ion secondary batteries are not so many as those of reports on positive electrode materials and a test on a negative electrode material using metal sodium, sodium-tin alloy, soft carbon, or the like is performed at present (Patent Document 1). Industrial use of a sodium metal, which is more active than a lithium metal, as a negative electrode material cannot be recommended from the standpoint of safety and development of an oxide-based negative electrode material is important. The present inventors therefore payed attention to the crystal structure of $Na_{0.44}MnO_2$ used as a positive electrode material and having a one-dimensional tunnel type structure.

The tunnel space of $Na_{0.44}$ $MnO_2$ is presumed to have a shape facilitating insertion or extraction of sodium ions. From the standpoint of a potential difference, $Na_xTi_4O_9$ ($2 \leq x \leq 3$) which is a sodium titanium oxide having, similar to $Na_{0.44}MnO_2$, a large one-dimensional tunnel type structure became a candidate for a negative electrode material. It however had the drawback that metal sodium was conventionally used for the synthesis of $Na_xTi_4O_9$ ($2 \leq x \leq 3$). In addition, synthesis of a $Na_xTi_4O_9$ ($2 \leq x \leq 3$) polycrystal has not yet been investigated.

CITATION LIST

Patent Document

Patent Document 1: Japanese Patent Laid-Open No. 2013-171798

SUMMARY

Technical Problem

With the forgoing in view, the present invention has been made. An object is to provide a polycrystal usable as an electrode active material of a secondary battery, a production method of the polycrystal, and a sodium ion secondary battery and a lithium ion secondary battery using the polycrystal.

Solution to Problem

A method of producing a polycrystal according to the present invention, the polycrystal being a single-phase polycrystal represented by the following formula: $Na_xTi_4O_9$ ($2 \leq x \leq 3$), having a one-dimensional tunnel type structure, and belonging to a monoclinic crystal system, includes a step of firing a raw material containing a sodium compound and at least one of a titanium compound and metal titanium at 800° C. or more but 1600° C. or less. In the method of producing a polycrystal according to the present invention, the polycrystal may be represented by the following formula: $Na_2Ti_4O_9$ and the method may further include a step of washing, with water, $Na_yTi_4O_9$ ($2 < y \leq 3$) obtained in the firing step.

In the method of producing a polycrystal according to the present invention, the raw material preferably contains $Na_4Ti_5O_{12}$ and metal titanium. In the method of producing a polycrystal according to the present invention, firing in the firing step is preferably performed in a non-oxidizing atmosphere. In the method of producing a polycrystal according to the present invention, firing is preferably performed while filling, with the raw material, a container made of at least one material selected from molybdenum, tungsten, tantalum, iron, nickel, and titanium.

The polycrystal of the present invention is a single-phase polycrystal represented by the following chemical formula: $Na_xTi_4O_9$ ($2 \leq x \leq 3$), having a one-dimensional tunnel type structure, and belonging to a monoclinic crystal system. Another polycrystal in the present invention is a single-phase polycrystal represented by the following chemical formula: $Na_2Ti_4O_9$, having a one-dimensional tunnel type structure, and belonging to a monoclinic crystal system. The sodium ion secondary battery of the present invention has a positive electrode, a negative electrode, and an electrolyte and has, as the active substance of the positive electrode or negative electrode, the polycrystal of the present invention. The lithium ion secondary battery of the present invention has a positive electrode, a negative electrode, and an electrolyte and has, as the active substance of the positive electrode or negative electrode, the polycrystal of the present invention.

Advantageous Effects of Invention

The present invention makes it possible to provide large-capacity sodium ion secondary battery and lithium ion secondary battery which are reversibly chargeable and dischargeable.

DESCRIPTION OF EMBODIMENTS

Figure 1:
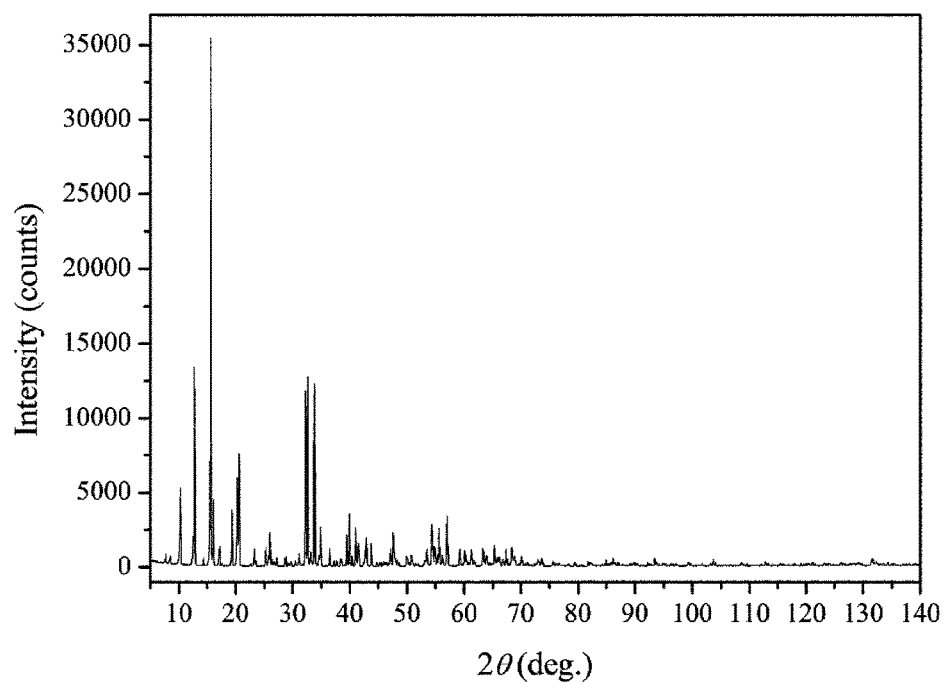
FIG. 1 is a powder X-ray diffraction pattern of the $Na_2Ti_4O_9$ crystal of the present invention.

The present inventors have found that a polycrystal of a sodium titanium oxide represented by the following chemical formula: $Na_xTi_4O_9$ ($2 \leq x \leq 3$) can be obtained by using sodium titanium oxide $Na_4Ti_5O_{12}$ and metal titanium as a raw material and firing them in a reducing atmosphere. Further, they have confirmed that a sodium ion secondary battery and a lithium ion secondary battery obtained using the resulting polycrystal as a negative electrode material perform a reversible charge/discharge reaction at a capacity of 55 mAh/g and a capacity of 120 mAh/g, respectively.

In the method of producing a polycrystal according to the present invention, the polycrystal is a single-phase polycrystal represented by the following chemical formula: $Na_xTi_4O_9$ ($2 \leq x \leq 3$), having a one-dimensional tunnel type structure, and belonging to a monoclinic crystal system. The method includes a step of firing a raw material containing a sodium compound and at least one of a titanium compound and metal titanium at 800° C. or more but 1600° C. or less. The polycrystal may be represented by the chemical formula: $Na_2Ti_4O_9$ and the method may further include a step of washing, with water, $Na_yTi_4O_9$ ($2<y\leq3$) obtained in the firing step to obtain $Na_2Ti_4O_9$.

In preparation of the raw material, the sodium compound and the metal titanium are weighed and mixed so as to substantially satisfy a ratio of each element of the chemical formula: $Na_xTi_4O_9$ ($2 \leq x \leq 3$). The sodium compound, the titanium compound, and the metal titanium may be weighed and mixed so as to substantially satisfy a ratio of each element of the above formula or the sodium compound and the titanium compound may be weighed and mixed so as to substantially satisfy a ratio of each element of the above formula. A mixing method is not particularly limited insofar as substances constituting the raw material can be mixed uniformly. For example, they may be wet mixed or dry mixed using a known mixing apparatus such as mixer.

The sodium compound is not particularly limited insofar as it contains sodium and examples include oxides such as $Na_2O$ and carbonates such as $Na_2CO_3$. Two or more sodium compounds may be used. Of these, $Na_2O$ is preferred. The titanium compound is not particularly limited insofar as it contains titanium and examples include oxides such as $TiO$, $Ti_2O_3$, and $TiO_2$ and chlorides such as $TiCl_4$. Two or more titanium compounds may be used. Alternatively, a sodium titanium oxide such as $Na_4Ti_5O_{12}$ may be used. Of these, raw materials containing a sodium titanium oxide $Na_4Ti_5O_{12}$ and metal titanium are preferred, with a raw material consisting of $Na_4Ti_5O_{12}$ and metal titanium being more preferred.

The raw material is preferably molded using, for example, a tablet mold having a diameter of about 10 mm before firing. In the firing step, firing is performed preferably in a non-oxidizing atmosphere. Examples of the non-oxidizing atmosphere include an atmosphere of an inert or reducing gas such as argon, nitrogen, hydrogen, or carbon monoxide. The firing temperature of the raw material can be determined as needed depending on the raw material used and is typically 800° C. or more but 1600° C. or less, preferably 1100° C. or more but 1350° C. or less. The firing time can be changed as needed depending on the firing temperature or the like. The cooling method is not particularly limited and typically, the product is allowed to cool naturally (allowed to cool in a furnace) or cooled gradually. After firing, the fired product may be surface-polished and then ground if necessary.

The material of a container to be filled with the raw material is not particularly limited in the firing step insofar as it is suited for use in the non-oxidizing atmosphere and at least one selected from molybdenum, tungsten, tantalum, iron, nickel, and titanium may be used. Of these, iron is particularly preferred as the material of the container. The fired product $Na_xTi_4O_9$ ($2 \leq x \leq 3$) reacts with water in the air and it deposits sodium as sodium hydroxide until it has a chemical composition: $Na_2Ti_4O_9$. The fired product is therefore stored preferably in a vacuum desiccator or the like. If $Na_yTi_4O_9$ ($2 \leq y \leq 3$) is prepared as the fired product, washing with water converts $Na_yTi_4O_9$ ($2 \leq y \leq 3$) into $Na_2Ti_4O_9$. Preparation of $Na_2Ti_4O_9$ can be judged from a change in the color of the fired product from black to white.

The polycrystal of the present invention is a single-phase polycrystal represented by the following chemical formula: $Na_xTi_4O_9$ ($2 \leq x \leq 3$), having a one-dimensional tunnel type structure, and belonging to a monoclinic crystal system. This means that this polycrystal has, in the space of its three-dimensional framework structure comprised of titanium oxide, a structure having therein one-dimensionally arranged sodium. The polycrystal of the present invention is preferably represented by the following chemical formula: $Na_2Ti_4O_9$. The lattice constants of the polycrystal in the embodiment of the present invention are as follows: 2.315 nm<a<2.320 nm, 0.2938 nm<b<0.2941 nm, 1.058 nm<c<1.061 nm, and 102.35°<β<102.44°.

The polycrystal of the present invention can be used as an electrode active substance of a sodium ion secondary battery or a lithium ion secondary battery. This means that the sodium ion secondary battery of the present invention has a positive electrode, a negative electrode, and an electrolyte and has the polycrystal of the present invention as the active substance of the positive or negative electrode. With regard to substances other than the electrode active substance, components of known sodium ion secondary batteries (such as coin, button, cylinder, and all-solid-state batteries) can be used as are.

An electrode can be obtained by mixing, with the polycrystal of the present invention serving as an electrode active substance, a conductive material, a binder, and the like if necessary to prepare an electrode mixture and then, contact bonding the resulting mixture to a collector. As the collector, stainless mesh, aluminum mesh, titanium mesh, nickel mesh, aluminum foil, and the like are preferably used. As the binder, tetrafluoroethylene, polyvinylidene fluoride, and the like are preferably used. A mixing proportion of the electrode active substance, conductive material, binder, and the like is not particularly limited and they may be mixed so that the resulting mixture typically has from about 1 to 30 mass %, preferably from 5 to 25 mass %, of the conductive material and 30 mass % or less, preferably from 3 to 10 mass %, of the binder, with the remaining portion being the electrode active substance.

When the above-described electrode is used as the negative electrode of the sodium ion secondary battery, a known material capable of occluding or releasing sodium such as sodium chromium oxide can be used for the positive electrode which is a counter electrode of the negative electrode. When a known negative electrode material such as metal sodium or sodium alloy containing sodium and capable of occluding or releasing sodium is used, the polycrystal of the present invention can be used as a material of the positive electrode of the sodium ion secondary battery.

The sodium ion secondary battery of the present embodiment can use, as a separator, cell container, or the like, a known one. In addition, the sodium ion secondary battery of the present embodiment can use, as an electrolyte, a known electrolyte solution or solid electrolyte. For example, a solution obtained by dissolving an electrolyte such as sodium perchlorate in a solvent such as propylene carbonate (PC) or ethylene carbonate (EC) can be used as the electrolyte solution.

The lithium ion secondary battery of the present invention has a positive electrode, a negative electrode, and an electrolyte and has the polycrystal of the present invention as the active substance of the positive electrode or the negative electrode. With regard to substances other than the electrode active substance, components of known sodium ion secondary batteries (such as coin, button, cylinder, and all-solid-state batteries) can be used as are. An electrode can be obtained by mixing, with the polycrystal of the present invention serving as an electrode active substance, a conductive material, a binder, and the like if necessary to prepare an electrode mixture and then, contact bonding the resulting mixture to a collector.

As the collector, stainless mesh, aluminum mesh, titanium mesh, nickel mesh, aluminum foil, and the like are preferably used. As the binder, tetrafluoroethylene, polyvinylidene fluoride, and the like are preferably used. A mixing proportion of the electrode active substance, conductive material, binder, and the like is not particularly limited and they may be mixed so that the resulting mixture typically has from 1 to 30 mass %, preferably from 5 to 25 mass %, of the conductive material and 30 mass % or less, preferably from 3 to 10 mass %, of the binder, with the remaining portion being the electrode active substance.

When the above-described electrode is used as the negative electrode of the lithium ion secondary battery, a known material capable of occluding or releasing lithium such as lithium cobalt oxide can be used for the positive electrode which is a counter electrode of the negative electrode. When a known negative electrode material such as metal lithium or lithium alloy containing lithium and capable of occluding or releasing lithium is used, the polycrystal of the present invention can be used as a material of the positive electrode of the lithium ion secondary battery.

The lithium ion secondary battery of the present embodiment can use, as a separator, cell container, or the like, a known one. The lithium ion secondary battery of the present embodiment can use, as an electrolyte, a known electrolyte solution or solid electrolyte. For example, a solution obtained by dissolving an electrolyte such as lithium perchlorate in a solvent such as propylene carbonate (PC) or ethylene carbonate (EC) can be used as the electrolyte solution. Examples will hereinafter be described to make the present invention clearer. The present invention is however not limited by these Examples.

Examples (Preparation of $Na_4Ti_5O_{12}$ Powder)

First, 0.693 g of sodium carbonate $Na_2CO_3$ (product of Kojundo Chemical Laboratory, purity: 99.99%) and 1.306 g of titanium dioxide $TiO_2$ (product of Kojundo Chemical Laboratory, purity: 99.99%) were placed in an agate mortar and were mixed uniformly using a wet method with ethanol. Then, an aluminum crucible with lid ("C2 model", product of Nikkato) was filled with 2 g of the resulting mixture. The crucible was placed in a box type electric furnace ("KDF009", product of Denken) and fired at 650° C. for 60 hours to prepare sodium titanium oxide $Na_4Ti_5O_{12}$ in powder form.

(Preparation of $Na_{2.8}Ti_4O_9$ and $Na_2Ti_4O_9$ Polycrystals)

The resulting $Na_4Ti_5O_{12}$ powder and a metal titanium polycrystal (product of Kojundo Chemical Laboratory, purity: 99.9%) were weighed respectively so that each element satisfied the mole ratio of the following chemical formula: $Na_3Ti_4O_9$ when mixed. They were mixed in a mortar. The resulting mixture was poured in a tablet press and then kept at 50 MPa for 3 minutes by using a hydraulic press ("P-16B", product of Riken) to obtain pellets having a diameter of 10 mm. Then, a container made of pure iron was filled with the resulting pellets, followed by firing at 1000° C. for 25 hours in an electric furnace ("SPSH-39", product of Siliconit Konetsu Kogyo). The fired pellets were allowed to cool naturally in the electric furnace to obtain black pellets of $Na_{2.8}Ti_4O_9$. After surface polishing of the $Na_{2.8}Ti_4O_9$ black pellets, they were ground in a mortar. The ground product was immersed in water in a 500-mL beaker. The water was changed repeatedly until it became neutral and thus, a white $Na_2Ti_4O_9$ polycrystal was obtained.

(Identification of $Na_2Ti_4O_9$ Polycrystal)

Figure 2:
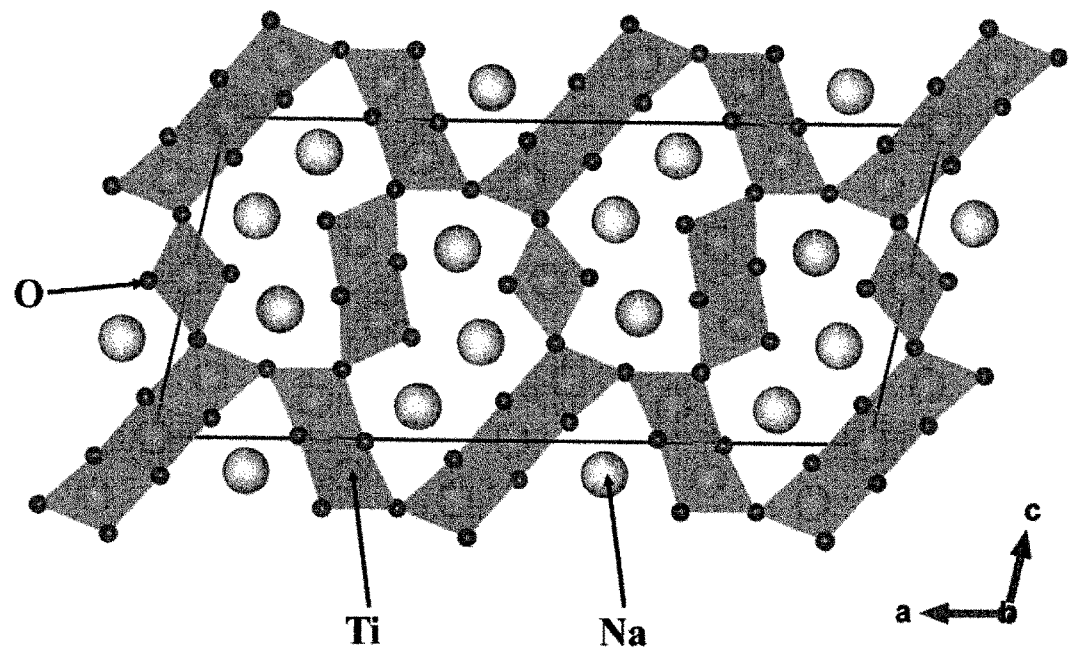
FIG. 2 shows a one-dimensional tunnel type structure of the $Na_2Ti_4O_9$ crystal of the present invention.

The $Na_2Ti_4O_9$ thus obtained was analyzed for its crystal structure by a powder X-ray diffractometer ("RINT2550V", product of RIGAKU). It has revealed that the polycrystal is a single-phase polycrystal having good crystallinity and belonging to a monoclinic crystal system. The powder X-ray diffraction pattern of it is shown in FIG. 1. In addition, results of the refinement of the crystal structure by powder X-ray structural analysis using the program Jana2006 have revealed that its chemical composition is $Na_{2.0}Ti_4O_9$. Further, it has lattice constants as shown below which are similar to those of a single crystal compound already reported. The crystal structure after refinement is shown in FIG. 2.

$a = 2.318$ nm $\pm 0.010$ nm $b = 0.294014$ nm $\pm 0.0018$ nm $c = 1.059078$ nm $\pm 0.0077$ nm $\beta = 102.3636$ deg $\pm 0.0051$ deg (Preparation of Lithium Ion Secondary Battery)

First, a negative electrode was prepared by mixing the resulting $Na_2Ti_4O_9$ polycrystal as a negative electrode active substance, acetylene black as a conductive material, and tetrafluoroethylene as a binder to give a mass ratio of 45:45:10, respectively. Next, a coin cell-type lithium ion secondary battery was prepared using the negative electrode thus obtained, a positive electrode made of a lithium metal, and, as an electrolyte solution, a 1M solution obtained by dissolving lithium hexafluorophosphate ($LiPF_6$) in propylene carbonate (PC). The battery was prepared in accordance with the known cell constitution and fabrication method.

(Measurement of Charge/Discharge Characteristics of Lithium Ion Secondary Battery)

Figure 3:
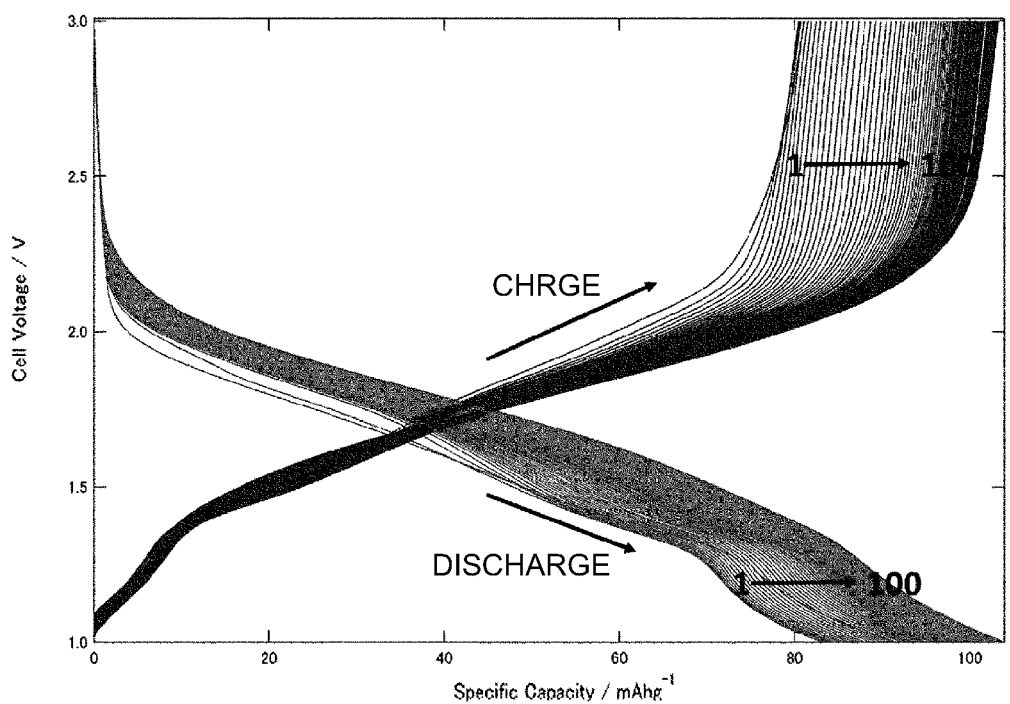
FIG. 3 is a graph showing charge/discharge characteristics of the lithium ion secondary battery of the present invention from 1 cycle to 100 cycles.

As a result of constant-current charge-discharge test of the lithium ion secondary battery thus obtained at a current density of 12 mAh/g and a cut off voltage of 3.0V-1.0V under temperature conditions of 25° C., a reversible charge and discharge cycle was achieved as follows. The battery discharged and charged at an initial discharge capacity of 86 mAh/g and an initial charge capacity of 81 mAh/g, respectively; after about 100 cycles, discharged and charged at a discharge capacity of 104 mAh/g and at a charge capacity of 104 mAh/g, respectively; and until 300 cycles, charged and discharged at a charge capacity of 104 mAh/g and at a discharge capacity of 104 mAh/g, respectively. The charge-discharge test results from 1 cycle to 100 cycles are shown in FIG. 3. These results have revealed that the $Na_2Ti_4O_9$ polycrystal is useful as an active substance of the lithium ion secondary battery.

(Preparation of Sodium Ion Secondary Battery)

A coin cell type sodium ion secondary battery was prepared using the negative electrode prepared above, a positive electrode made of a sodium metal, and, as an electrolyte solution, a 1 M solution obtained by dissolving sodium perchlorate in propylene carbonate (PC). The battery was prepared in accordance with the known cell constitution and fabrication method.

As a result of the constant-current charge-discharge test of the resulting sodium ion secondary battery performed at a current density of 12 mAh/g and a cut-off voltage of 2.5V-0.1V under temperature conditions of 25° C., the battery discharged and charged at an initial discharge capacity of 553 mAh/g and an initial charge capacity of 120 mAh/G, respectively and thus showed a large irreversible capacity. The second discharge capacity was however 127 mAh/g so that the large irreversible capacity disappeared. Such irreversible capacity is presumed to occur because of the decomposition of the electrolyte solution during the initial discharging.

Then, the charge-discharge capacity decreased and after about 40 cycles, the discharge capacity and the charge capacity were 56 mAh/g and 54 mAh/g, respectively. The test was continued until 60 cycles and the charge capacity and the discharge capacity at 60 cycles were 52 mAh/g and 51 mAh/g, respectively. It has been confirmed that a decrease in the charge/discharge capacity has settled and the charge/discharge cycle of the resulting battery is reversible.

Figure 4:
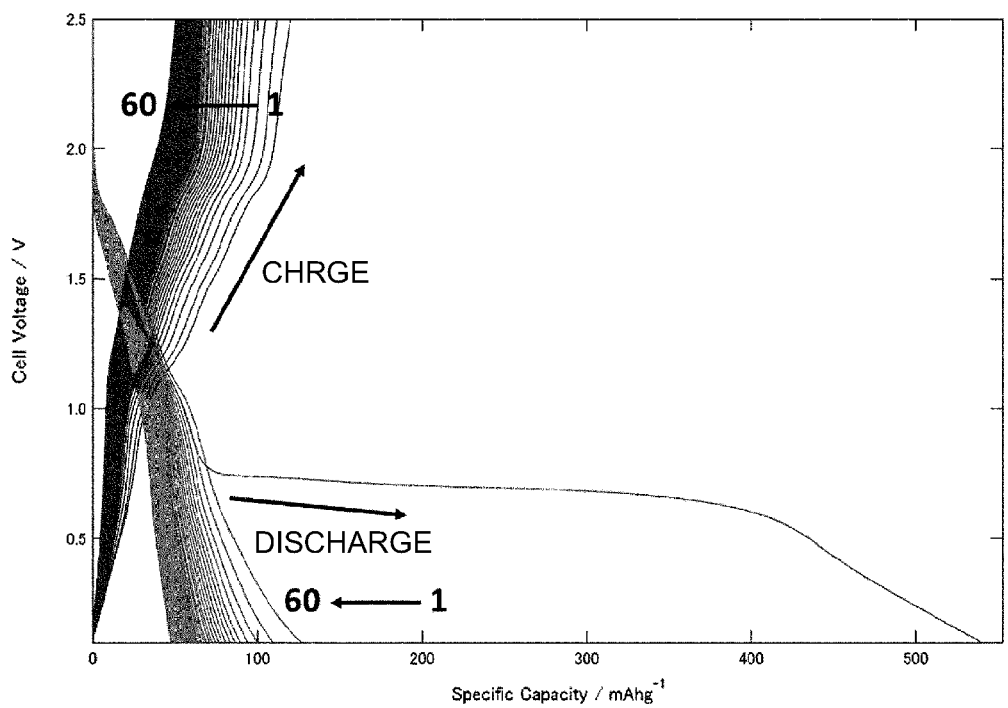
FIG. 4 is a graph showing charge/discharge characteristics of the sodium ion secondary battery of the present invention from 1 cycle to 60 cycles.

FIG. 4 shows the charge-discharge test results from 1 cycle to 60 cycles. It has been revealed from the results that the $Na_2Ti_4O_9$ polycrystal is useful as an active substance of a sodium ion secondary battery.

INDUSTRIAL APPLICABILITY

The sodium titanium oxide polycrystal of the present invention can be used as an electrode active substance of a lithium ion secondary battery or sodium ion secondary battery.

What is claimed is:

1. A method of producing a polycrystal, the polycrystal being a single-phase polycrystal represented by the following chemical formula: $Na_xTi_4O_9$ ($2 \leq x \leq 3$), having a one-dimensional tunnel type structure, and belonging to a monoclinic crystal system, comprising:
   a step of firing a raw material containing a sodium compound and at least one of a titanium compound and metal titanium at 800° C. or more but 1600° C. or less,
   wherein the polycrystal is represented by the following formula: $Na_2Ti_4O_9$ and the method further comprises a step of washing, with water, $Na_yTi_4O_9$ ($2 < y \leq 3$) obtained in the firing step.

2. The method of producing a polycrystal according to claim 1,
   wherein the raw material contains $Na_4Ti_5O_{12}$ and metal titanium.

3. The method of producing a polycrystal according to claim 1,
   wherein firing in the firing step is performed in a non-oxidizing atmosphere.

4. The method of producing a polycrystal according to claim 1,
   wherein in the firing step, firing is performed while filling, with the raw material, a container made of at least one material selected from molybdenum, tungsten, tantalum, iron, nickel, and titanium.

5. A sodium ion secondary battery, comprising a positive electrode, a negative electrode, and an electrolyte,
   wherein the positive electrode or negative electrode has, as an active substance thereof, a polycrystal which is a single-phase polycrystal represented by the following chemical formula: $Na_xTi_4O_9$ ($2 \leq x \leq 3$), having a one-dimensional tunnel type structure, and belonging to a monoclinic crystal system.

6. A lithium ion secondary battery, comprising a positive electrode, a negative electrode, and an electrolyte,
   wherein the positive electrode or negative electrode has, as an active substance thereof, a polycrystal which is a single-phase polycrystal represented by the following chemical formula: $Na_xTi_4O_9$ ($2 \leq x \leq 3$), having a one-dimensional tunnel type structure, and belonging to a monoclinic crystal system.

* * * * *